Figure 1:
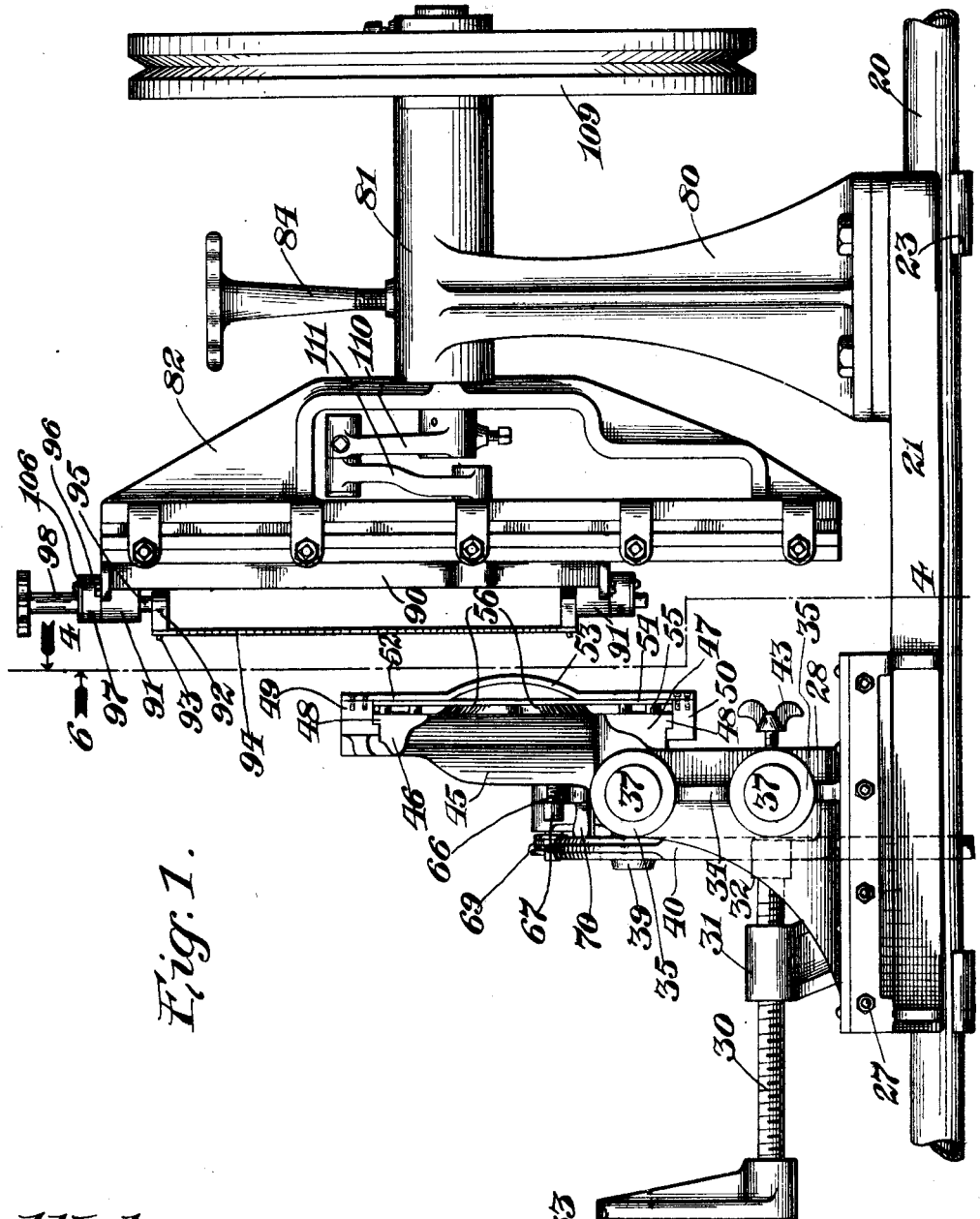

G. A. DOBYNE.
HEEL CUTTING MACHINE.
APPLICATION FILED SEPT. 1, 1911.

1,066,387.

Patented July 1, 1913.
7 SHEETS—SHEET 1.

Witnesses:
Chas. A. Becker
Henry M. Hertel

Inventor:
George A. Dobyne
By John H. Bruninga
Attorney

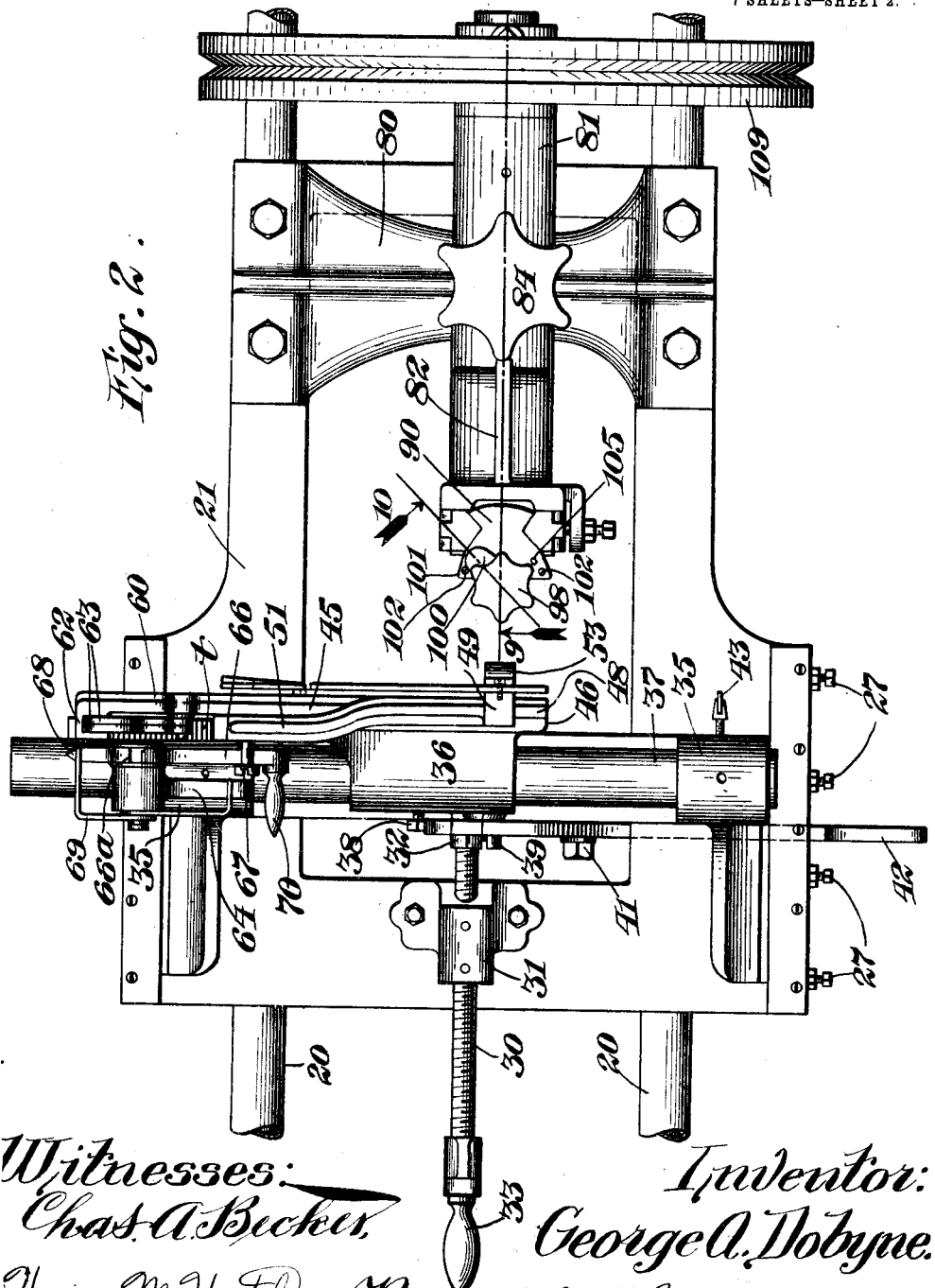

G. A. DOBYNE.
HEEL CUTTING MACHINE.
APPLICATION FILED SEPT. 1, 1911.
1,066,387.
Patented July 1, 1913.
7 SHEETS—SHEET 3.
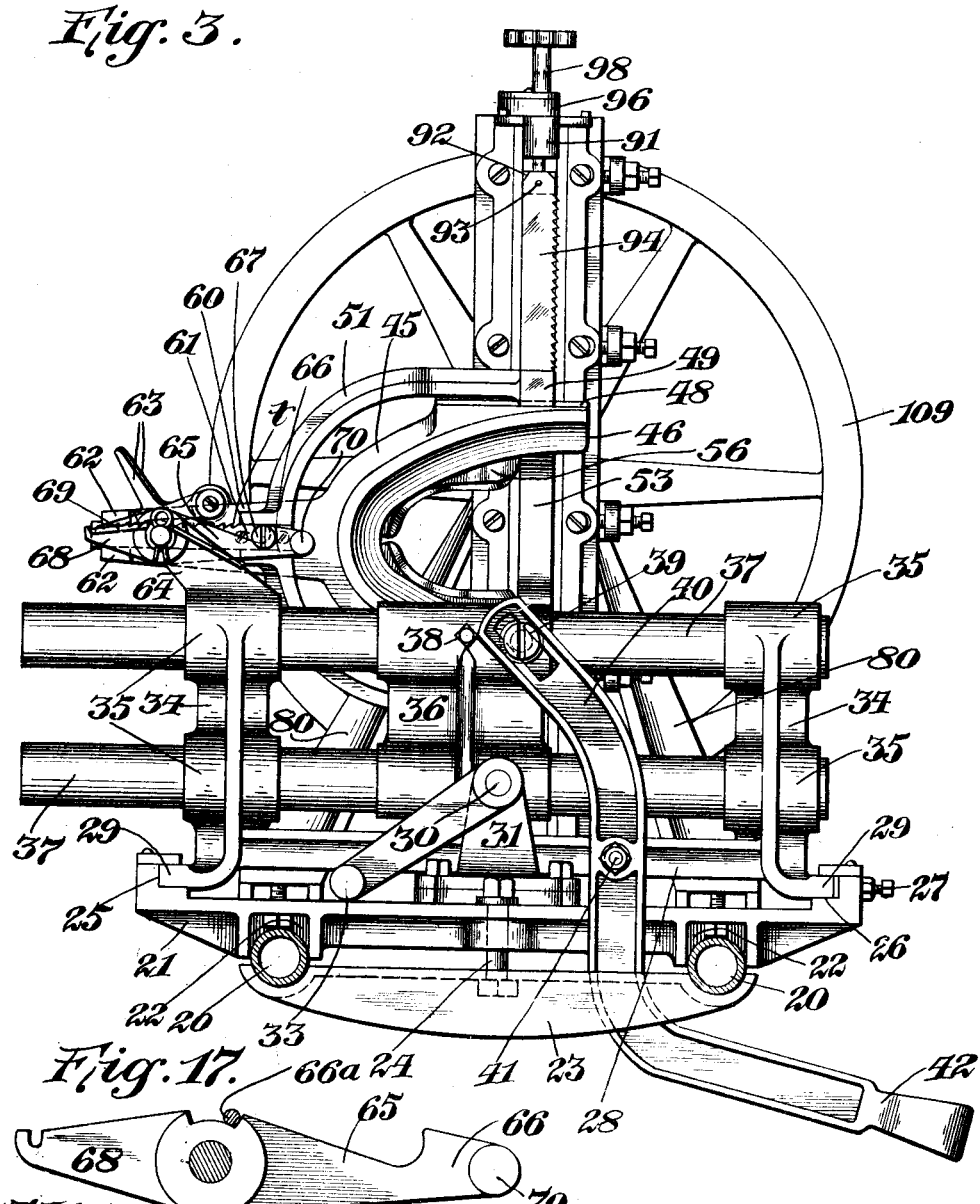
Witnesses:
Chas. A. Becker,
Henry M. Hertel
Inventor:
George A. Dobyne.
By John H. Bruninga
Attorney.

G. A. DOBYNE.
HEEL CUTTING MACHINE.
APPLICATION FILED SEPT. 1, 1911.

1,066,387.

Patented July 1, 1913.

7 SHEETS—SHEET 4.

Witnesses:
Chas. A. Becker
Henry M. Hertel

Inventor:
George A. Dobyne.
By John H. Bruninga
Attorney.

G. A. DOBYNE.
HEEL CUTTING MACHINE.
APPLICATION FILED SEPT. 1, 1911.
1,066,387.
Patented July 1, 1913.
7 SHEETS—SHEET 5.
Fig. 6.
Fig. 7.
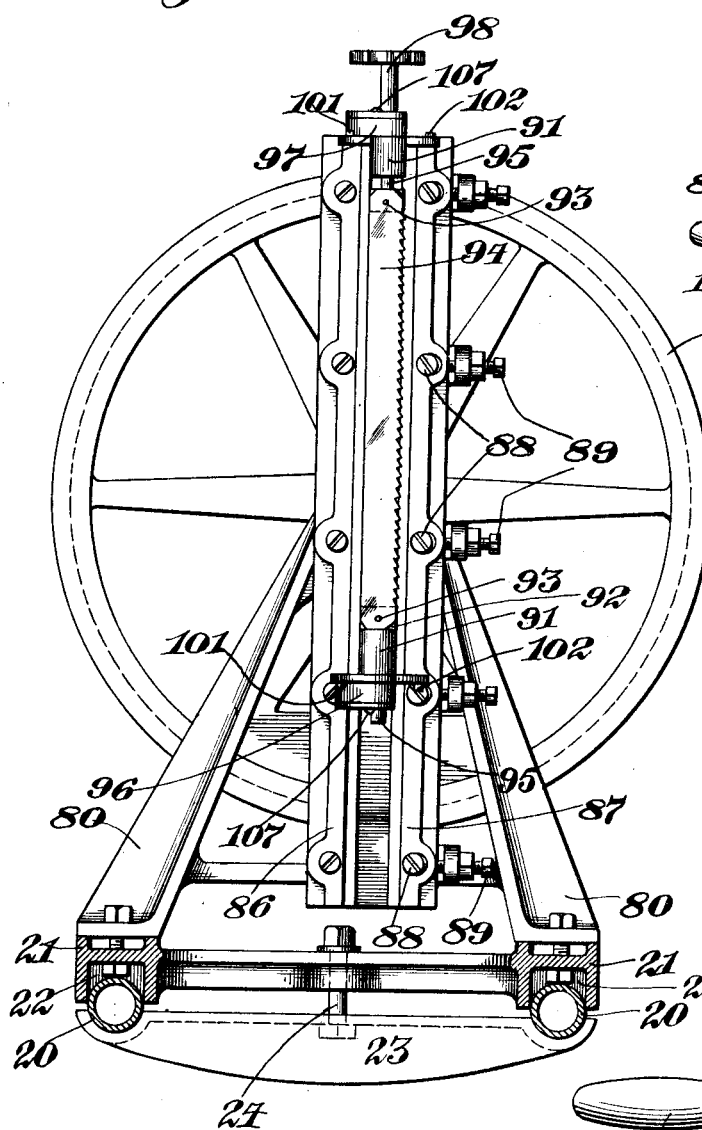
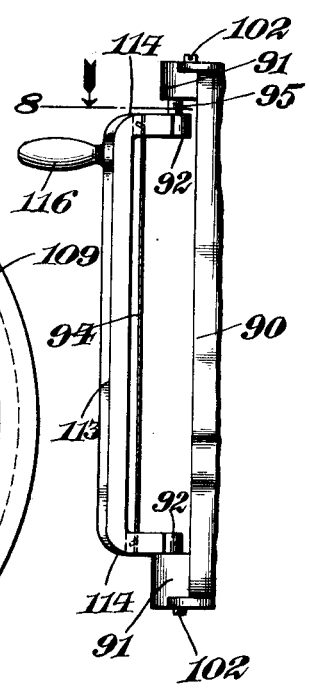
Fig. 8.
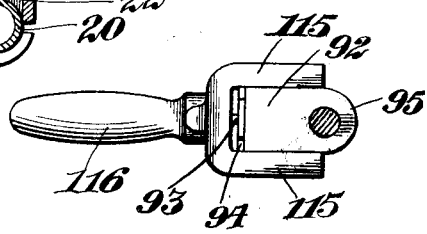
Witnesses:
Chas. A. Becker,
Henry M. Hertel
Inventor:
George A. Dobyne.
By John H. Bruninga,
Attorney.

G. A. DOBYNE.
HEEL CUTTING MACHINE.
APPLICATION FILED SEPT. 1, 1911.
1,066,387.
Patented July 1, 1913.
7 SHEETS—SHEET 6.
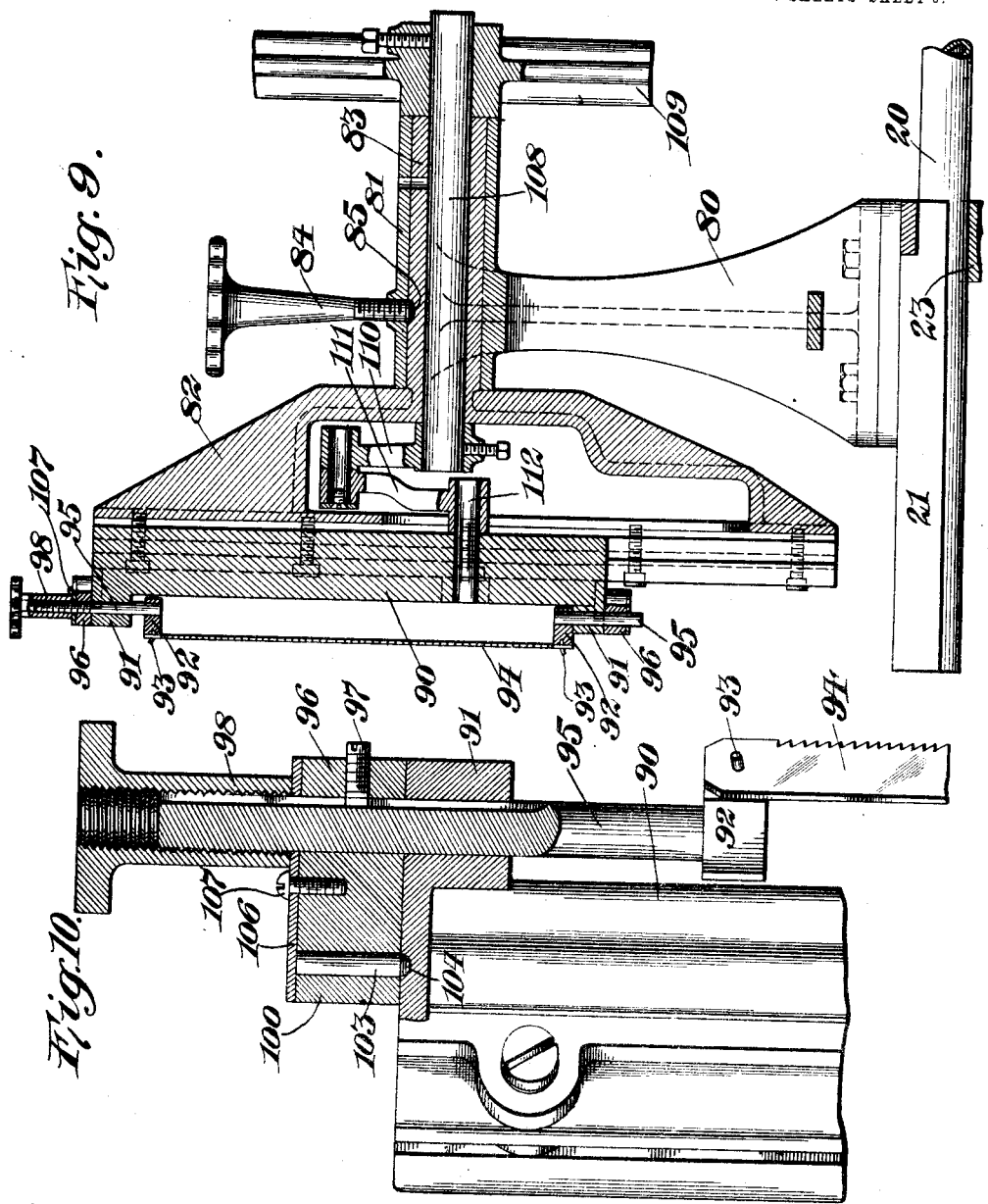
Witnesses:
Chas. A. Becker
Henry M. Hertel
Inventor:
George A. Dobyne
By John H. Bruninga
Attorney.

G. A. DOBYNE.
HEEL CUTTING MACHINE.
APPLICATION FILED SEPT. 1, 1911.
1,066,387.
Patented July 1, 1913.
7 SHEETS—SHEET 7.
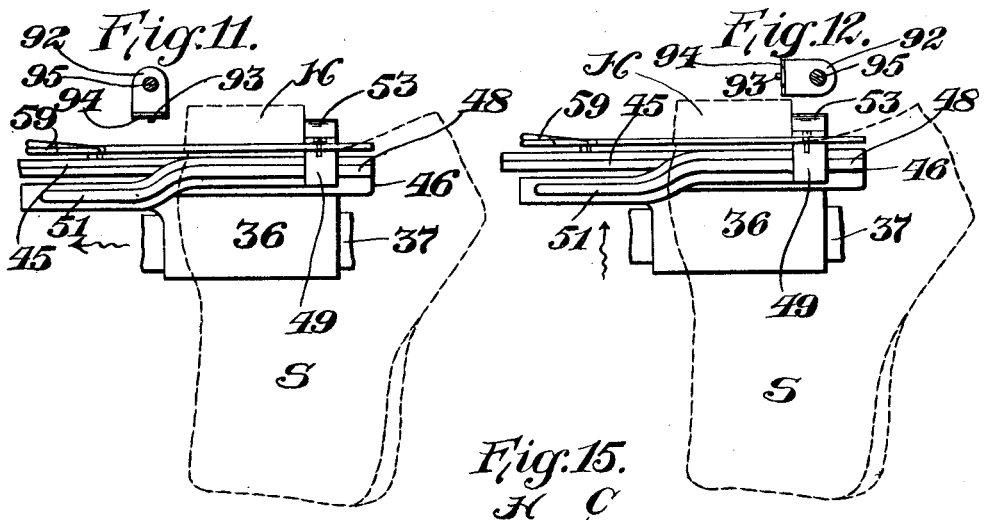
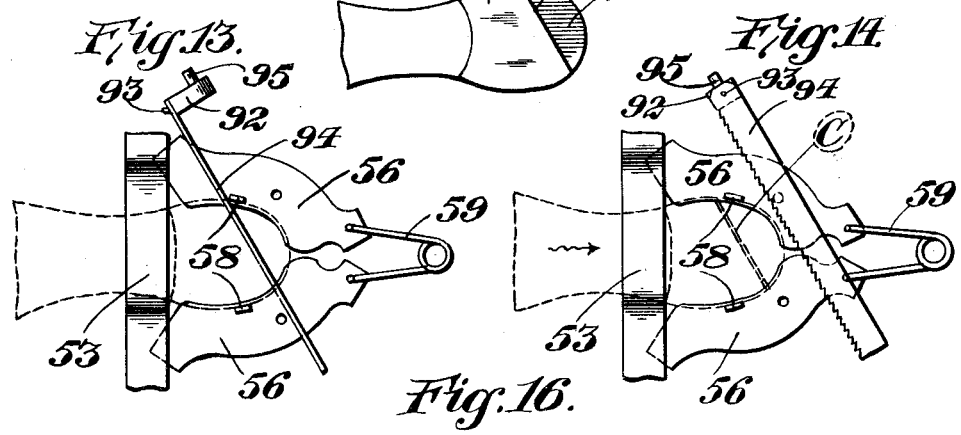
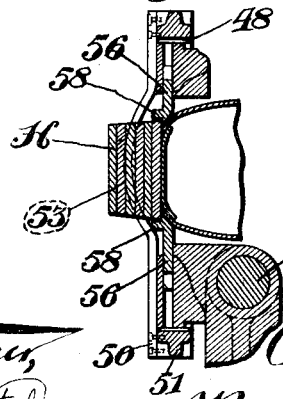
Witnesses:
Chas. A. Bicke,
Henry M. Hertel
Inventor:
George A. Dobyne.
By John N. Bruninga.
Attorney.

UNITED STATES PATENT OFFICE.

GEORGE A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

HEEL-CUTTING MACHINE.

1,066,387. Specification of Letters Patent. Patented July 1, 1913.

Continuation of application Serial No. 593,356, filed November 21, 1910. This application filed September 1, 1911. Serial No. 647,295.

*To all whom it may concern:*

Be it known that I, GEORGE A. DOBYNE, a citizen of the United States, and residing at St. Louis, in the State of Missouri, have invented certain new and useful Improvements in Heel-Cutting Machines, of which the following is a specification.

This invention relates to heel machines and particularly to machines adapted to be used for repair work.

In repairing shoes which have worn and run-down heels, the prior practice has been to nail wedges on the heel until a level surface is obtained, when lifts can be nailed on to build up the heel to the desired form and height. This operation not only involves a good deal of time and not only requires considerable skill, but the heel built up in such a manner will not be solid and will not possess sufficient strength to maintain its shape when in use.

One of the objects of this invention is to construct a machine which will prepare and level the heel so that the lifts may be quickly nailed on, and in which the resultant heel will be very much better and stronger than heels repaired and built up according to prior practice.

In the use of the machine involving this invention the heel is cut off and leveled to furnish a level surface. The cut is either made across the entire heel, or the machine is so arranged that a piece may be cut out of the tread. The surface so leveled furnishes a firm and level foundation for the lifts used for building up the heel to the required height.

Figure 4:
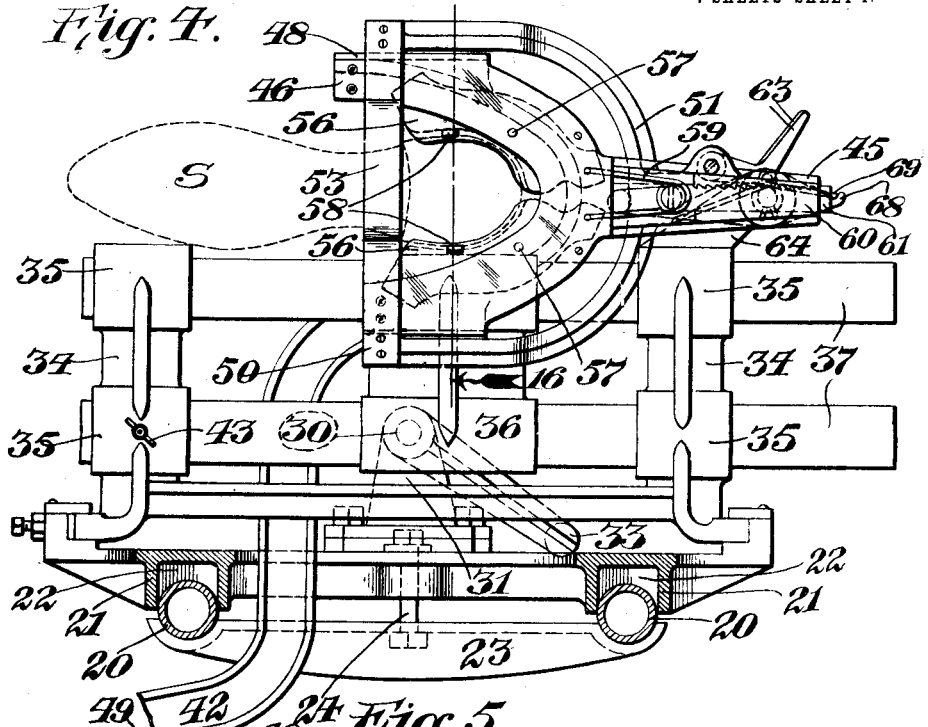
Figure 5:
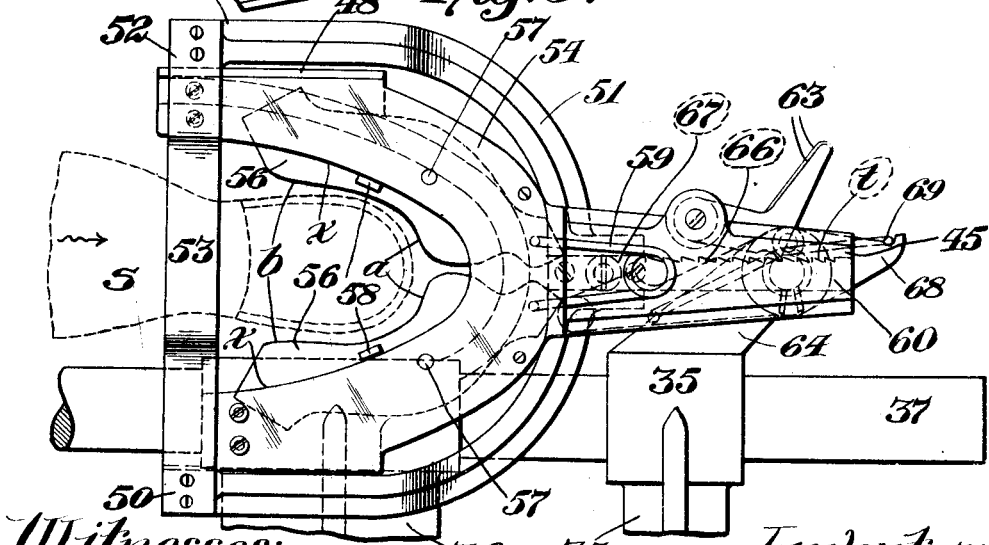

Further objects will appear from the detail description taken in connection with the accompanying drawings in which:

Figure 1 is a front elevation of a machine embodying this invention, Fig. 2 is a plan view, Fig. 3 is a side elevation looking toward the left side of the machine, Fig. 4 is a section on the line 4—4 Fig. 1 looking in the direction of the arrow 4, Fig. 5 is a view similar to Fig. 4, but on an enlarged scale and showing the parts in position with the shoe unclamped or released, Fig. 6 is a section on the line 4—4 Fig. 1 looking in the direction of the arrow 6, Fig. 7 is a front elevation of a part of the cutter slide and its cutter showing the tool for adjusting the cutter, Fig. 8 is a section on the line 8 Fig. 7 showing the tool in plan, Fig. 9 is a section on the line 9 Fig. 2, Fig. 10 is a section on the line 10 Fig. 2, Figs. 11, 12, 13 and 14 are views showing different adjusted positions of the cutter and shoe support to adapt the machine for different operations, Fig. 15 is a view of a shoe having a piece cut out of the heel tread, Fig. 16 is a section on the line 16 Fig. 4, and Fig. 17 is a detail of the work support latch.

Generally stated the machine consists of a work support adapted to clamp the shoe thereon, either on or off the last, and a cutter, the parts being relatively movable to cause them to coöperate to operate upon the shoe. Means are provided for adjusting the work support and cutter to cause them to coöperate in different manners for different operations on a shoe.

Referring to the drawings, 20 designates a pair of horizontally extending bars forming a support for the machine frame, these bars being in turn supported at their ends in pedestals or brackets (not shown). A frame 21 is supported on these bars in any suitable manner, for instance as shown in Figs. 3, 4 and 6 by having depending channel portions provided with lugs 22 arranged to rest upon and partially embrace the bars. A number of clamps 23, in this case two, engage and embrace the bars 20 from below, and bolts 24 extend through the clamps and into the frame and clamp the frame on the bars.

The frame 21 is provided with guideways 25 and 26, the guideway 26 having a liner which is adjustable to take up wear by means of screws 27. A carrier or carriage 28 is provided with outwardly extending guide members 29 working in the guideways. A threaded shaft 30 is threaded into a bracket 31 on the frame 21 and has a loose bearing in a bracket 32 on the carriage 28. The shaft 30 is provided with a handle 33 so that the carriage may be adjusted in its guides or ways by turning the handle 33.

The carriage 28 has cast integral therewith a pair of standards 34 provided with bearings 35. A casting or support 36 has secured therein a pair of guide bars 37, these guide bars being rigidly secured to the casting 36 in any suitable manner, as by means of set screws 38, and sliding in the bearings 35. A stud 39 is mounted on the casting 36 and engages a slot in an actuator lever 40 which is pivoted at 41 upon the carriage 28 and is provided with a forwardly extending handle 42 arranged to be operated from the front of the machine. A wing screw 43 on one of the standards 34 is arranged to engage and clamp one of the bars 37. By means of this construction the casting 36 may be moved in its guides crosswise of the machine by means of the actuator 42 and may be locked in any desired position by means of a wing screw 43.

The casting 36 has secured thereto or preferably formed integral therewith a member 45 which is substantially U-shaped and forms a carrier for the shoe. The legs 46 and 47 of this carrier are machined as shown at 48 to form upper and lower guideways for the machined ends 49 and 50 of the carrier 51. This carrier is substantially U-shaped and supports a breast engaging member 52 which is curved as shown at 53 to conform to the curvature of the sole at the shank of the shoe. A plate 54 is spaced from the carrier 45 by means of collars 55 and is secured thereto in spaced relation by means of screws as shown in Figs. 4 and 5. A pair of plates 56 are supported in the recess formed between the carrier 45 and the plate 54 to turn on pintles 57 secured to the plates 56 and working in bearings in the carrier 45 and the plate 54. Lugs 58 are secured to the plates 56, and a spring 59 engaging the tail ends of the plates 56 is arranged to throw these plates outwardly or to open position as shown in Fig. 5, the movement of these plates being limited by the engagement of the lugs 58 with the inside edges $x$ of the plate 54. The inside edges of the plates 56 are beveled to blunt edges as shown in Figs. 1 and 3, and these edges are arranged to enter the rand crease of a shoe as hereinafter described.

The carrier 45 has a rearwardly extending lug 60, and the carrier 51 has secured thereto a rearwardly extending bar 61 guided between spaced bearing lugs 62 on 60. The bar 61 is provided with ratchet teeth $t$ arranged to be engaged by one or more pawls 63 pivotally supported upon the lug 60 so as to move therewith. The left hand standard 34 has formed thereon a lug 64 which pivotally supports a latch 65 (shown in detail in Fig. 17) having a beveled and hook-shaped head 66 adapted to engage a keeper stud 67 on the carrier 51.

A tail-piece 68 on the latch under the tension of a spring 69 serves to elevate the head 66 of the latch, a stop 66$^a$ being provided to limit the upward movement, and the latch is provided with a handle 70 so that it may be depressed to release it from the stud 67.

The operation of the work support in clamping the shoe will first be described. In Fig. 5 the breast engaging member is shown in its open position, i. e., away from the crease engaging members 56, and these crease engaging members are thrown to their outer or open positions by means of the spring 59. It will be noted that the end portions $a$ of the crease engaging members, i. e., those edge portions engaging the end of the shoe, are drawn inwardly by the rotation of the members about their pintles 57. Now if the shoe S be moved in the direction of the arrow Fig. 5, the portions $a$ engaging the crease at the rear end of the shoe will enter the crease, and at the same time the pressure of the shoe rearwardly will swing the crease engaging members about their pintles so that the edges $b$ will move inwardly to enter the crease at the sides of the shoe and firmly grip the shoe. The result will be that the crease engaging members will enter the crease around the sides and end of the shoe as shown in Fig. 4 so as to firmly grip the shoe in position. The inward movement of the crease engaging members will be limited by the engagement of the lugs or stops 58 with the heel as shown in Figs. 4 and 16. In this way damage to the shoe is prevented. The crease engaging members will adjust themselves automatically to the shoe as these members and shoe are moved relatively, and this adjustment takes place automatically irrespective of the size of the shoe. Thus if a small shoe is inserted between the crease engaging members they will swing inwardly to a greater extent, and in the case of a large shoe they will not swing in so much. The shape of these members is however such that they will grip and conform to shoes of different sizes.

In the actual operation of clamping a shoe in the support the breast engaging member 53 is moved to expanded position, and the handle 42 is then operated to move the carriers 45 and 51 connected by the rack $t$ and pawls 63 rearwardly until the stud 67 snaps into engagement with the latch 65 as shown in Fig. 3. A shoe is then placed in position with its rand crease engaging the members 56 and the handle 42 is moved down. The breast engaging member 53 will be held stationary on the carriage 28 by the latch 65, while the carrier 45 will be moved forwardly. This will cause the shoe to be firmly gripped between the crease engaging and breast engaging members, and the pawls 63 coöperating with the ratchet or rack $t$ will firmly lock the parts in clamped position. The latch 65 can now be depressed to release the carriage 45, so that the shoe on the carrier 45 may be moved across and along the frame 21 by operating the handles 42 and 33 respectively. The shoe can be unclamped by merely raising the pawls 63 and pulling the shoe forwardly.

It will be noted therefore that the handle 42 and the lever to which it is connected form an actuator for clamping the shoe in position on the support and for moving the shoe carriage 45 crosswise of its frame.

A pedestal 80 is bolted on the frame 21 and is provided with a bearing 81. A carrier or support 82 is provided with a hub 83 having a bearing in 81 so that the carrier 82 is arranged to be adjusted angularly in its bearing and locked in adjusted position by means of a handscrew 84, the hub 83 being preferably provided with one or more recesses 85 for locating the carrier in adjusted position. The carrier has bolted thereto a pair of plates 86 and 87 forming a dove tailed guideway, the plate 87 being adjustably mounted on the carrier by having a slotted connection with its screws 88, and by being adjustable by set screws 89. A slide 90 is mounted in the guideway and is provided with spaced lugs 91 forming bearings for blocks 92 which have pins 93 thereon for engaging holes in the ends of a cutter or saw 94. The bearing axles 95 on the blocks 92 have secured thereto hubs 96, the lower hub being rigidly secured to its axle in any suitable manner, and the upper hub having a screw 97 engaging a slot or keyway cut in the axle. The upper axle is also screw threaded to receive a knurled hand wheel 98 so that the upper block may be adjusted toward and from the lower block for removal and replacement of a cutter. The hubs 96 are each provided with a projection 100 arranged to engage stops 101 and 102 on the slide 90 as shown in Fig. 2. A pin 103 is loosely mounted in the projection 100 and is arranged to coöperate with recesses 104 and 105 in the slide 90. A plate 106 is mounted on the hub by means of a screw 107 and is arranged to bear on the end of the pin 103. Only the pin for the upper hub has been shown in detail, but it will be understood that the lower hub has a similar pin coöperating with similar stops 101 and 102 and similar recesses 104 and 105. A driving shaft 108 provided with a belt pulley 109 is mounted in the hub 83 and is provided at its inner end with a crank 110 connected by a link 111 with a pin 112 rigidly secured in the slide 90. Rotation of the shaft 108 will impart a reciprocating movement to the slide 90 and the cutter blade 94 connected to move therewith. The cutter together with its blocks 92 (which blocks form together a carrier for the cutter) may be adjusted angularly on the slide to position the cutter in a plurality of angular positions with respect to said slide. For instance, if the cutter is adjusted to the position shown in Fig. 10, with the projections 100 in engagement with the stops 101 and with the pins 103 engaging the recesses 104, the cutter will be positioned parallel to the slide. If however the cutter and its carrier blocks are adjusted so as to place the projections in engagement with the stops 102 and with the pins 103 engaging the recesses 105, then the cutter will be positioned with its cutting edge at right angles to the slide. This position is shown in Fig. 12. The cutter may also be adjusted angularly about a horizontal axis. This is accomplished by loosening the handscrew 84, rotating the carrier 82 to the desired angular position, and then clamping it in adjusted position by means of the handscrew 84. Such an angular position is shown in Figs. 13 and 14.

In order that the cutter may be adjusted about its vertical axis, the tool or adjusting member shown in Figs. 7 and 8 is provided. This tool consists of a bar 113, preferably ribbed for strength, and provided at its ends with angularly extending portions 114 each consisting of a pair of spaced lugs 115 arranged to embrace the square faces of the blocks 92. The bar is provided at its upper end with a handle 116. In the operation of adjusting the cutter, the screws 107 are loosened to release the pins 103 from their recesses. The tool is then placed in position as shown in Figs. 7 and 8, and then the cutter can be adjusted to its other position by simply moving the handle 116, thereby rotating the blocks or carrier members 92 together with the cutter about their axles 95 to adjusted position. The cutter can therefore be adjusted without requiring its removal, and without straining or twisting the same. After the cutter is in its adjusted position with the pins 103 coöperating with their recesses, the screws 107 may be tightened to firmly lock the parts in adjusted position. It will be understood that the plate 106 may be made sufficiently yielding to permit the rounded ends of the pins 103 to snap out of and into the recesses 104 and 105.

The operation of the machine for operating upon heels will now be described.

The shoe is clamped on the shoe support with its heel in a definite relation with respect to the support and the cutter. The shoe support therefore positions and presents the shoe and the heel thereon, with respect to the cutter by means located with respect to and by the heel seat. The cutter will therefore operate on the heel with the heel seat as a gaging point. This is advantageous and necessary in repair work as the heel tread is worn down irregularly and cannot therefore be used as a gaging point. After the shoe S has been clamped on the work support as described with the tread of the heel H facing the cutter, the heel may be operated upon in a variety of manners. If it is desired to cut through the heel parallel with the heel seat of the shoe, the cutter is positioned with respect to the heel as shown in Fig. 11 and in the other views. By moving the shoe carrier 45 in the direction of the arrow Fig. 11, by operating the handle 42, the cutter can be passed through the heel to reduce the height thereof, the cutter or saw cutting through both the leather and the nails. The depth of the cut can be controlled by adjusting the carriage 28 toward and from the knife by means of the handle 33. The cutter in this operation will cut across the entire tread and reduce the height of the entire heel so as to level the same for the application of other heel lifts. If it is desired to breast the heel, the cutter is adjusted to the position shown in Fig. 12. The carrier 45 is now adjusted and locked in adjusted position by means of the screw 43, and the carrier 28 is moved in the direction of the arrow Fig. 12 by means of the handle 33 so as to breast the heel. It is sometimes desirable where the heel is run down only on one side or at the rear to cut out only a piece of the heel as shown in Fig. 15. To do this the cutter is adjusted angularly with respect to the heel as shown in Fig. 13 by adjusting the same to the position shown in Fig. 12, and by swinging the same about its hub 83 and locking it in adjusted position by means of the handscrew 85. A cut C Fig. 15 is now made to the required depth. The cutter is now adjusted to the position shown in Fig. 14 by swinging it about the axles 95 parallel to the heel seat, leaving the angular position of the carrier 82 undisturbed, and the carrier 43 is then moved in the direction of the arrow Fig. 14 to cut parallel to the heel seat and cut out a piece leaving a cut out portion P in the heel H. Lifts can be built up in this cut out portion, and these lifts will be on a level and solid foundation. It will therefore be seen that this invention accomplishes its objects. The machine is so designed that it can be used for a variety of operations, which is desirable especially in repair work where first cost is of considerable importance, and where the space is considerably more limited than in shoe factories. The shoe is firmly gripped in the support and will be firmly held in position in the support whether on or off of the last. No interior work support is therefore required, thereby reducing the time of operation and the requirement of a number of different sized supports. The crease engaging members are so shaped that they will adjust themselves automatically to shoes of different sizes, and therefore need not be changed.

It is obvious that various changes may be made in the details of construction without departing from this invention, and it is therefore to be understood that this invention is not to be limited to the specific construction shown and described.

This application is a continuation of my application Serial No. 593,356, filed Nov. 21, 1910, as to subject matter which is common to the two applications.

Having thus described the invention what is claimed is:

1. In a heel machine, the combination of a cutter, a shoe support adapted to receive and support a shoe and constructed and arranged to position the shoe with its heel seat in a predetermined relation with respect to said cutter and present the heel on the shoe in coöperative relation with respect to said cutter, and means for moving said support and cutter relatively, constructed to pass the cutter through the heel to reduce the height thereof.

2. In a heel machine, the combination of a cutter, a shoe support adapted to receive and support a shoe and constructed and arranged to position the shoe with its heel seat in a predetermined relation with respect to said cutter and present the heel on the shoe in coöperative relation with respect to said cutter, and means for moving said support and cutter relatively, constructed to cause the cutter to cut through the heel parallel to the heel seat.

3. In a heel machine, the combination of a frame, a cutter, a shoe support adapted to receive and support a shoe and constructed and arranged to position the shoe with its heel seat in a predetermined relation with respect to said cutter and present the heel on the shoe in coöperative relation with respect to said cutter, and guides on said frame for one of said members constructed to permit said support and cutter to be moved relatively to pass the cutter through the heel to reduce the height thereof.

4. In a heel machine, the combination of a support, a cutter, means for clamping a shoe on said support constructed and arranged to position the shoe with its heel seat in a predetermined relation with respect to said cutter and present the heel on the shoe in coöperative relation with respect to said cutter, and means whereby said support and cutter may be moved relatively, constructed to pass the cutter through the heel to reduce the height thereof.

5. In a heel machine, the combination of a support, a cutter, and means for clamping a shoe on said support constructed and arranged to position the shoe with its heel seat in a predetermined relation with respect to said cutter and present the heel on the shoe in coöperative relation with respect to said cutter and for moving said support and cutter relatively, constructed to pass the cutter through the heel to reduce the height thereof.

6. In a heel machine, the combination of a support and a cutter relatively movable, means for clamping a shoe on said support, and means constructed to successively operate said clamping means and move said support and cutter relatively to pass the cutter through the heel to reduce the height thereof.

7. In a heel machine, the combination of a cutter, a support movable with respect to said cutter, means for clamping a shoe on said support, and means constructed to first close said clamp to clamp the shoe and then move said support with respect to the cutter to pass the cutter through the heel to reduce the height thereof.

8. In a heel machine, the combination of a support, a cutter, shoe clamping means on said support, an actuator, and means coöperating with said actuator constructed to first operate said clamping means and then move said support and cutter relatively to pass the cutter through the heel to reduce the height thereof.

9. In a heel machine, the combination of a support, a cutter, shoe clamping means on said support, an actuator, and means constructed to render the actuator effective to operate the clamping means or move said support and cutter relatively to pass the cutter through the heel to reduce the height thereof.

10. In a heel machine, the combination of a support, a cutter, shoe clamping means on said support, an actuator, and means constructed to engage said clamping means to cause said actuator to operate the same, and to disengage said clamping means to cause said actuator to move said support and cutter relatively to pass the cutter through the heel to reduce the height thereof.

11. In a heel machine, the combination of a support, a cutter, shoe clamping means on said support, an actuator, means constructed to engage said clamping means to cause said actuator to operate the same, and to disengage said clamping means to cause said actuator to move said support and cutter relatively to pass the cutter through the heel to reduce the height thereof, and means for locking said clamping means after it is disengaged.

12. In a heel machine, the combination of a shoe support and a cutter relatively movable to cause the cutter to cut the heel, and means for adjusting said cutter and support relatively to cause the cutter to either reduce the height of the heel or breast the same.

13. In a heel machine, the combination of a shoe support and a cutter relatively movable to cause the cutter to cut the heel, and means for adjusting said cutter and support relatively to cause the cutter to cut a piece out of the tread of the heel.

14. In a heel machine, the combination of a shoe support and a cutter relatively movable to cause the cutter to cut the heel, and means for adjusting said cutter and support relatively to cause the cutter to either reduce the height of the heel or cut a piece out of the tread thereof.

15. In a heel machine, the combination of a shoe support and a cutter relatively movable to cause the cutter to cut the heel, and means for adjusting said cutter and support relatively to cause the cutter to either cut a piece out of the tread of the heel or breast the same.

16. In a heel machine, the combination of a shoe support and a cutter relatively movable to cause the cutter to cut the heel, and means for adjusting said cutter and support relatively to cause the cutter to either reduce the height of the heel, breast the heel, or cut a piece out of the tread of the heel.

17. In a heel machine, the combination of a shoe support and a cutter relatively movable to cause the cutter to cut the heel, and means for adjusting said cutter to positions to cut substantially parallel with and at right angles to the heel seat.

18. In a heel machine, the combination of a shoe support and a cutter relatively movable to cause the cutter to cut the heel, and means for adjusting said cutter to cut substantially parallel with the heel seat, parallel with the heel breast, and at an angle to the heel breast.

19. In a heel machine, the combination of a shoe support and a cutter relatively movable to cause the cutter to cut the heel, means for adjusting said cutter angularly to a plurality of positions with respect to the heel, and means whereby said support and cutter may be moved relatively toward and from each other in directions corresponding with the adjustments of said cutter.

20. In a heel machine, the combination of a shoe support and a cutter relatively movable to cause the cutter to cut the heel, means for adjusting said cutter angularly to a plurality of positions with respect to the heel, and means whereby said support and cutter may be moved relatively toward and from each other in a plurality of angularly disposed paths corresponding with the adjustments of said cutter, constructed to cause the cutter to cut the heel when said support and cutter are moved relatively in any of said paths.

21. In a heel machine, the combination of a shoe support, a reciprocating cutter blade, means whereby said blade may be adjusted angularly to a plurality of positions, and means whereby said support and blade may be moved relatively in directions corresponding with the adjustments of said blade.

22. In a heel machine, the combination of a frame, a shoe support, a cutter, ways on said frame for supporting one of said members for movement toward and from the other in a plurality of angularly disposed paths, and means for adjusting said cutter to positions corresponding with said paths, constructed to cause the cutter to cut the heel when said support and cutter are moved relatively in any of said paths.

23. In a heel machine, the combination of a frame, a shoe support, a cutter adjustable angularly to a plurality of positions, and ways on said frame for supporting said support for movement toward and from said cutter in a plurality of paths corresponding to the adjusted positions of said cutter.

24. In a heel machine, the combination with a shoe support, of a coöperating cutter, and means for adjusting said cutter to two positions with its cutting edge facing in directions disposed at right angles.

25. In a heel machine, the combination with a shoe support, of a coöperating cutter blade, a carrier for said blade, means for vibrating said blade on said carrier, and means for adjusting said carrier with said blade to different angular positions with respect to said shoe support.

26. In a heel machine, the combination with a shoe support, of a coöperating cutter blade, a carrier having means for detachably securing a cutter blade thereon, means for vibrating said blade on said carrier, and means for adjusting said carrier with said blade to different angular positions with respect to said shoe support.

27. In a heel machine, the combination with a shoe support, of a coöperating cutter blade, a carrier having means thereon for detachably securing a cutter blade thereto at its ends, and means for adjusting said carrier with said blade to different angular positions.

28. In a heel machine, the combination with a frame and a shoe support thereon, of a coöperating cutter blade, a carrier for said blade, means for vibrating said blade on said carrier, and means for mounting said carrier on said frame to turn thereon to adjust said blade to different angular positions with respect to said shoe support.

29. In a heel machine, the combination with a frame and a shoe support thereon, of a coöperating cutter blade, a carrier for said blade, means for vibrating said blade on said carrier, and means for adjusting said carrier and blade about axes at right angles.

30. In a heel machine, the combination with a frame and a shoe support thereon, of a coöperating cutter blade, a carrier for said blade comprising a pair of members detachably engaging the ends of said blade, and means for supporting said members on said frame for angular adjustment.

31. In a heel machine, the combination with a frame and a shoe support thereon, of a slide mounted to reciprocate on said frame, power operated means for vibrating said slide, and a cutter blade mounted on said slide and constructed to be adjusted to different angular positions.

32. In a heel machine, the combination with a frame and a shoe support thereon, of a slide mounted to reciprocate on said frame, and a cutter blade mounted on said slide and constructed to be adjusted thereon to positions parallel with and at right angles to said slide.

33. In a heel machine, the combination with a frame and a shoe support thereon, of a slide mounted to reciprocate on said frame, a cutter blade, and members mounted on said slide and adapted to detachably support the blade at its ends on said slide, said members being adjustable on said slide to different angular positions.

34. In a heel machine, the combination with a frame and a shoe support thereon, of a slide mounted to reciprocate on said frame, a cutter blade, members mounted on said slide and adapted to detachably engage the ends of said blade, and means whereby said members may be adjusted relatively and angularly on said slide.

35. In a heel machine, the combination with a frame and a shoe support thereon, of a slide mounted to reciprocate on said frame, a cutter blade, members engaging the ends of said blade and mounted for angular adjustment on said slide, and stops for positioning said members and blade on said slide.

36. In a heel machine, the combination with a frame and a shoe support thereon, of a slide mounted to reciprocate on said frame, a cutter blade, bearings on said slide, and members mounted to turn in said bearings and having means for detachably engaging the ends of said blade, said members and blade being adjustable to different angular positions.

37. In a heel machine, the combination with a frame and a shoe support thereon, of a slide mounted to reciprocate on said frame, a cutter blade, bearings on said slide, and members mounted to turn in said bearings and having means for detachably engaging the ends of said blade, and stops for positioning said members and blade in different angular positions.

38. In a heel machine, the combination with a frame and a shoe support thereon, of a slide mounted to reciprocate on said frame, a cutter blade, bearings on said slide, members mounted to turn in said bearings and having means for detachably engaging the ends of said blade, and yielding latches for latching said members and blade in different angular positions.

39. In a heel machine, the combination with a frame, of a shoe support thereon, a coöperating power operated vibrating cutter, a support for said cutter, and means for mounting said cutter support on said frame for adjustment about an axis at right angles to said cutter.

40. In a heel machine, the combination with a frame, of a shoe support thereon, a coöperating vibrating cutter, a guide for said cutter, means on said frame for operating said cutter, and means for mounting said guide on said frame for adjustment about an axis at right angles to said cutter.

41. In a heel machine, the combination with a frame, of a shoe support thereon, a coöperating vibrating cutter, a guide for said cutter, a shaft connected to operate said cutter and having a bearing in said guide, and means for mounting said guide on said frame for adjustment about an axis at right angles to said cutter.

42. In a heel machine, the combination with a frame, of a shoe support thereon, a coöperating vibrating cutter, a guide for said cutter, and a hub on said guide for mounting said cutter and guide on said frame for adjustment about an axis at right angles to said cutter.

43. In a heel machine, the combination with a frame, of a shoe support thereon, a coöperating vibrating cutter, a guide for said cutter, a hub on said guide for adjustably mounting said guide and cutter on said frame, and a shaft for operating said cutter and having a bearing in said hub.

44. In a heel machine, the combination of a cutter, a support having means thereon for clamping a shoe so as to leave the heel tread free, and means for moving said support and cutter relatively, constructed to pass the cutter through the heel to reduce the height thereof.

45. In a heel machine, the combination of a cutter, a support having means thereon engaging the rand crease of the shoe to clamp the shoe on said support, and means for moving said support and cutter relatively, constructed to pass the cutter through the heel to reduce the height thereof.

46. In a heel machine, the combination of a cutter, a support having means thereon engaging the rand crease of the shoe to clamp the shoe on said support, and means for moving said support and cutter relatively in angularly disposed paths constructed to cause the cutter to cut the heel parallel with and at an angle to the heel seat.

47. In a heel machine, the combination of a cutter, a support having means thereon for clamping a shoe so as to leave the heel tread free, and means for moving said support and cutter relatively in angularly disposed paths constructed to cause the cutter to cut the heel parallel with and at an angle to the heel seat.

48. In a heel machine, the combination of a cutter, a support having means thereon for clamping a shoe so as to leave the heel tread free, means for adjusting one of said members to different angular positions, and means for moving said members relatively in angularly disposed paths corresponding to said angular positions, to cause the cutter to cut the heel.

49. In a heel machine, the combination of a cutter, a support having means thereon engaging the rand crease of the shoe to clamp the shoe on said support, means for adjusting one of said members to different angular positions, and means for moving said members relatively in angularly disposed paths corresponding to said angular positions, to cause the cutter to cut the heel.

In testimony whereof I affix my signature in presence of two witnesses.

GEORGE A. DOBYNE.

Witnesses:
J. V. MANNING,
J. H. BRUNINGA.